(12) United States Patent
Dubnack et al.

(10) Patent No.: US 6,177,988 B1
(45) Date of Patent: Jan. 23, 2001

(54) ARRANGEMENT FOR THE MEASUREMENT OF OPTICAL RADIATION OF RADIATION SOURCES

(75) Inventors: Steffen Dubnack; Stefan Ernsperger; Frank Luemkemann; Heino Weigand, all of Jena (DE)

(73) Assignee: Carl Zeiss Jena GmbH, Jena (DE)

( * ) Notice: Under 35 U.S.C. 154(b), the term of this patent shall be extended for 0 days.

(21) Appl. No.: 09/398,750

(22) Filed: Sep. 17, 1999

(30) Foreign Application Priority Data

May 31, 1999 (DE) ............................................. 199 26 036

(51) Int. Cl.$^7$ .......................................................... G01J 1/56
(52) U.S. Cl. ........................... 356/216; 356/220; 356/222
(58) Field of Search .................................... 356/213, 216, 356/214, 215, 218, 220, 222, 225, 226, 228, 236; 250/228, 227.24

(56) References Cited

U.S. PATENT DOCUMENTS

| | | |
|---|---|---|
| 4,580,557 | 4/1986 | Hertzmann . |
| 4,710,642 | 12/1987 | McNeil . |
| 4,932,779 * | 6/1990 | Keane ..................................... 356/236 |
| 5,057,682 | 10/1991 | Michon et al. . |
| 5,153,426 * | 10/1992 | Konrad et al. ........................ 250/228 |
| 5,251,004 * | 10/1993 | Doiron et al. ........................ 356/236 |
| 5,650,843 * | 7/1997 | Moberg et al. ........................ 356/236 |

FOREIGN PATENT DOCUMENTS

| | | |
|---|---|---|
| 28 32 847 | 2/1980 | (DE) . |
| 28 34 982 | 2/1980 | (DE) . |
| 40 29 637 | 2/1992 | (DE) . |

* cited by examiner

Primary Examiner—Frank G. Font
Assistant Examiner—Sang H. Nguyen
(74) Attorney, Agent, or Firm—Reed Smith, LLP

(57) ABSTRACT

An arrangement for measuring the power or energy of optical radiation of radiation sources, especially laser radiation is disclosed. It comprises a module defining an open or at least partially closed hollow space, wherein the inner walls or outer walls of the module are entirely or partially occupied by detectors for generating measurement signals which are proportional to the measured parameters of the radiation sources. The detectors are connected together in such a way that their generated measurement signals are further processed to form at least one resultant sum signal or the detectors are connected to a downstream processing device to form at least one resultant sum signal. This at least one resultant sum signal is relatively independent from the position, arrangement and radiating characteristic of the examined radiation source in the module. At least one opening or guide-through is provided in the module for inserting the radiation source to be examined.

16 Claims, 3 Drawing Sheets

US 6,177,988 B1

ARRANGEMENT FOR THE MEASUREMENT OF OPTICAL RADIATION OF RADIATION SOURCES

BACKGROUND OF THE INVENTION a) Field of the Invention

The invention is directed to an arrangement for the measurement of optical radiation of radiation sources, especially radiation power.

b) Description of the Related Art

Power measuring devices for measuring optical radiation of radiation sources, especially also of laser radiation sources, can vary, for example, between power measuring devices for directionally radiating sources, also called power meters, such as bolometers, photodiodes, and power measuring devices for diffusely radiating sources (high-divergence sources) such as Ulbricht spheres.

Both types, both diffusely and directionally radiating fiber applicators with lengths of up to 10 cm and diameters up to 20 mm, are used in photodynarric therapy (PDT). Knowledge of the radiation power delivered by the applicator being used is crucial for the successful course and conclusion of treatment. At the present time, the principle of Ulbricht spheres is applied for power measurement.

An Ulbricht sphere of the type mentioned above is described in "ABC der Optik [The ABC's of Optics]", VEB Brockhaus Verlag, Leipzig, 1961, 484–485, in connection with luminous flux meters. This Ulbricht sphere is constructed in such a way that the most uniform possible distribution of the emitted radiation takes place in the interior of the sphere. A part of the diffusely reflected radiation is converted by a suitable detector whose receiver surface is small in comparison to the inner surface of the sphere, e.g., by a photodiode, into an electric signal which is proportional to the radiation output. Further, this measuring device is disadvantageous in that the measurement values are also dependent on the size of the radiation sources to be measured and on their position in the sphere.

For this reason, in order to suppress possible radiation characteristics of expanded radiation sources, the Ulbricht sphere must be as large as possible, the inner surface must reflect as diffusely as possible, and the receiver must be small in comparison to the inner surface and must be protected from direct radiation. Taking into account the requirement for measurement of the above-mentioned applicators with a length of 10 cm and a diameter of 20 mm, an Ulbricht sphere necessary for this purpose is difficult to integrate in an existing device or device design already by virtue of its size and, moreover, increases the cost of manufacture.

OBJECT AND SUMMARY OF THE INVENTION

Accordingly, it is the primary object of the invention to provide a measuring arrangement which makes it possible to measure with great accuracy the optical radiation of a radiation source irrespective of the position of the radiation source in the measuring arrangement and independent from or dependent on its radiation characteristic in an economical manner, with a limited space requirement and without a diffusely reflecting inner surface.

The above object is achieved in accordance with the invention, by an arrangement for measuring the power or energy of optical radiation of radiation sources, especially laser radiation, having a housing. The arrangement comprises a module defining an open or at least partially closed hollow space. The module has inner and outer walls. The inner and outer walls of the module are entirely or partially occupied by detectors for generating measurement signals which are proportional to measured parameters of the radiation sources. The detectors are connected together in such a way that their generated measurement signals are further processed to form at least one resultant sum signal or the detectors are connected to a downstream processing device to form at least one resultant sum signal. The at least one resultant sum signal is relatively independent from the position, arrangement and radiating characteristic of the examined radiation source in the module. At least one opening or guide-through is provided in the module for inserting the radiation source to be examined.

Accordingly, in contrast to the known Ulbricht sphere, the measurement arrangement according to the invention is based on the principle of detecting and converting all radiation output acting on the arrangement, wherein virtually the total radiation output emitted by the radiation source is converted into proportional electrical measurement signals by corresponding detectors or converters.

In an advantageous embodiment form of the invention, said detectors for generating the measurement signals are constructed from one or more photoelectric detectors or receivers extensively covering the inner surface of the module. Large-area photodetectors are advantageously provided in the module. A direct conversion of the emitted radiation of the radiation source into processible electric measurement signals is carried out by means of an arrangement of this type. The detectors are connected in such a way that the measurement signals generated by them are summed and a conversion of radiation power to (electrical) signal which is as linearly proportional as possible is carried out. In this way, virtually the entire output of the radiation source can take part in signal formation. The sum signal formed in this way is sent to the input of the evaluating device.

Measurement gauges which react to heat or detectors which convert expansions caused by heat into electrical measurement signals, e.g., strain gauges, can also be arranged in or on the module as detectors. The detectors or measurement gauges are connected in such a way that the electrical signals generated by them are summed. These electrical signals are then likewise supplied to the evaluating device for further processing.

In another embodiment form, a processing of the individual measurement signals of the detectors can also be carried out in such a way that conclusions can be reached about the radiating characteristics of the radiation source. In this connection, the measurement signals are evaluated individually taking into account the position of the respective detectors within the module.

According to a further arrangement according to the invention, the walls of the module are constructed so as to be reflecting in that they are provided with one or more reflectors. Accordingly, the module comprises, for example, a base plate, a plate for receiving the radiation source to be investigated, and a reflector which is connected with the base plate, wherein the surface of the base plate facing the reflector and the inner surface of the receiving plate are extensively occupied by said detectors for generating measurement signals. In this way, among other things, a relatively large component of the radiation striking the detectors can contribute directly, or via additional optical elements, to the formation of the measurement signal.

The reflector itself is advantageously formed of a reflecting cylinder surface and a plane reflecting surface which is inclined relative to the base surface.

The evaluating circuit comprises an electronic summing circuit, known per se, for summing the signals generated by the receivers. Therefore, one electrical signal is generated for the totality of radiation released in the interior of the module, wherein this electrical signal is proportional, e.g., to the radiation power and is itself independent from the spatial position of the radiation source inside the module and from the size and radiating characteristic of the radiation source.

The housing enclosing the entire arrangement and the module, in at least one of its bounding surfaces, advantageously have an opening, wherein receiving means for receiving the radiation source to be measured project into the opening. Above all, these receiving means protect the interior of the module, which is the actual measuring space of the arrangement, from damaging outside influences.

The receiving means for the radiation source to be measured advantageously comprise a first tube which is transparent for the radiation and which is fixedly connected with the housing and is exchangeable.

For purposes of gauging and calibrating the arrangement, adjusting and/or calibrating means are provided for monitoring or controlling the physical relationships in the measurement volume of the module. These means can be arranged in a space-saving manner, for example, at one of the inner surfaces or at the receiving plate of the module in order to conceal as little as possible of the reflecting surface in the interior of the module. These adjusting and calibrating means can be at least a direct radiation source, e.g., a laser, an incandescent lamp, or a light-emitting diode. This radiation source can also be an indirect source, e.g., a light-conducting fiber or a light waveguide.

Further, a second tube is advantageously arranged in the first tube in an exchangeable manner. Accordingly, it is also possible to insert a sterilized second tube into the first tube in an uncomplicated manner, wherein the radiation source to be investigated is arranged in this sterilized second tube. These two tubes are made of a material which is transparent for the radiation in question, preferably glass or a transparent plastic.

It is further advantageous that the measurement signals obtained through the arrangement are further processed directly and are used in such a way that the radiation source itself is matched (calibrated) automatically or manually to a value which is preadjusted by the user.

This arrangement can also be calibrated by using calibrated diffusely or directionally radiating radiation sources and can be checked with respect to the local measurement accuracy of the aforementioned detectors for generating the relevant measurement signals. The utilized radiation source is moved relative to the arrangement or in the arrangement itself in order to calibrate and monitor the calibration or the local measurement sensitivity.

The invention will be described more fully in the following with reference to an embodiment example.

BRIEF DESCRIPTION OF THE INVENTION

In the drawings:

FIG. 1 perspective view of the arrangement according to the invention;

DESCRIPTION OF THE PREFERRED EMBODIMENTS

Figure 1:
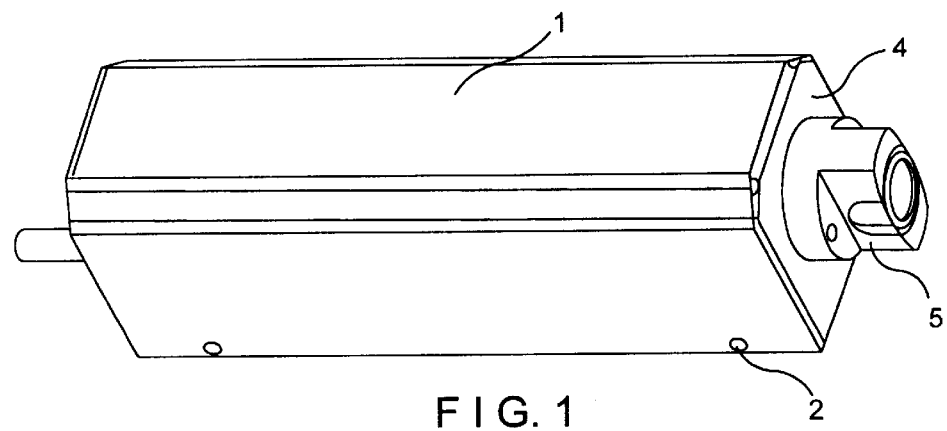

The arrangement for measuring the output or power of the optical radiation of radiation sources shown in a perspective view in FIG. 1 comprises a first outer housing 1 which is fastened, e.g., by screws 2, to a base plate 3 (FIG. 3) and a receiving connection piece 5 is arranged at one of its end faces 4. A module 6 comprising the elements for measuring the radiation is provided inside the housing 1.

Figure 2:
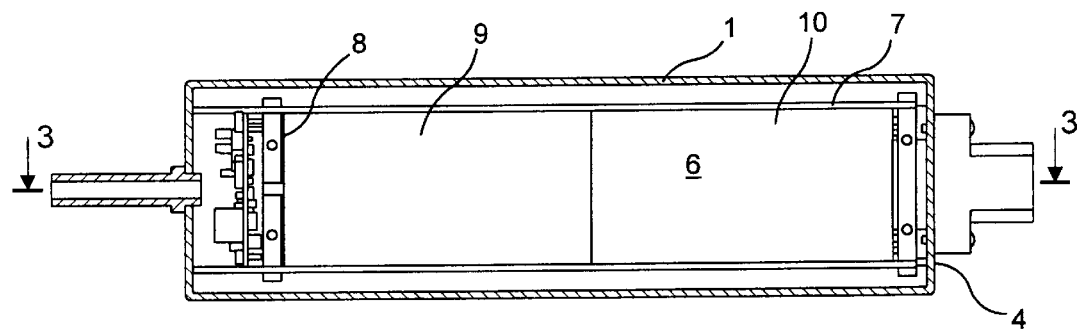
FIG. 2 is a top view of a section F—F through the arrangement.
Figure 3:
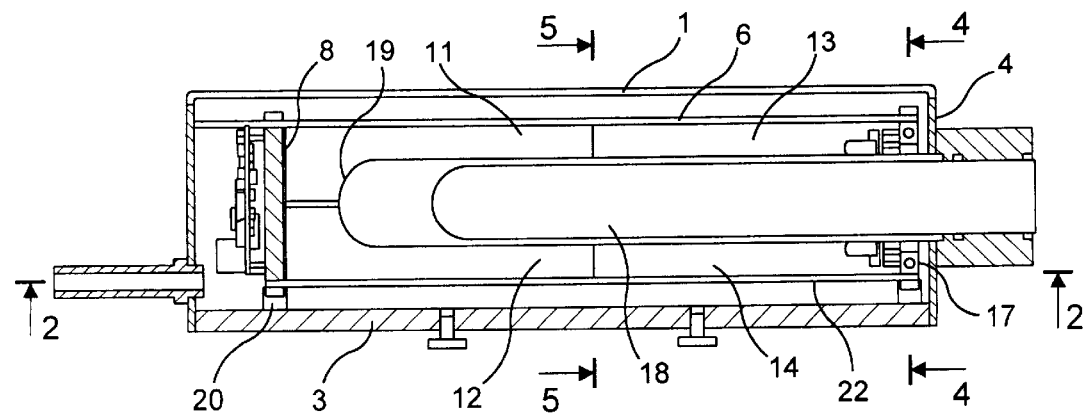
FIG. 3 is a section A—A through the arrangement.
Figure 5:
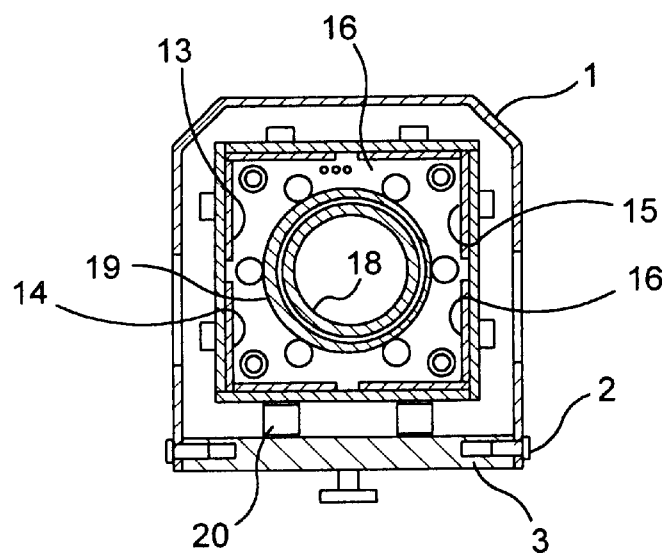
FIG. 5 is a cross section B—B through the arrangement.

This module 6 comprises a preferably square second inner housing 7 which is outfitted at all inner circumferential surfaces and at least one inner end face 8 extensively over the entire surface with large-area detectors 9 to 16 (i. e., detector 9, 10, 11, 12, 13, 14, 15 and 16) advantageously with photodetectors, by means of which a compensation of the radiating characteristics of the radiation sources to be investigated is also achieved to a great extent (FIGS. 2, 3 and 5). Due to the fact that the inner surface of the module 6 is covered over virtually its entire surface with detectors 9 to 16 reacting to the incident radiation in some way, for example in that photocurrents are generated or in that the radiation is converted into heat which is then converted, e.g., by heat gauges or strain gauges, into electrical signals that can be further processed, virtually all of the radiation emitted by the radiation source which is to be measured is detected for measurement irrespective of its spatial distribution. These detectors 9 to 16 are connected in such a way that their electrical signals are combined by summing and can be prepared by a suitable electronic evaluating circuit. This evaluating circuit (not shown) can include a summing circuit for summing the electrical signals generated by the detectors and receivers. An electronic circuit which includes a current-voltage transformer can also be a component part of the evaluating device and is simultaneously arranged in such a way that a corresponding wavelength-dependent calibration of the entire power measuring device (power meter) can be carried out. For this purpose, a power-dependent current present at the input of a converter can be converted, for example, into a proportional power-dependent voltage at the output of the converter.

The receiving connection piece 5 and the end face 4 of the housing 1 carrying this receiving connection piece 5 and the front terminating plate 17 of the module 6 (FIGS. 3 and 4) have an opening in which a second tube 18 which can be sterilized by radiation, heat, or chemicals in the form of gases or liquids can be inserted. This tube 18 is held by the receiving connection piece 5 and projects into a first tube 19 of material transparent to radiation which is supported in the end face 4 of the housing 1 (FIG. 3).

Figure 4:
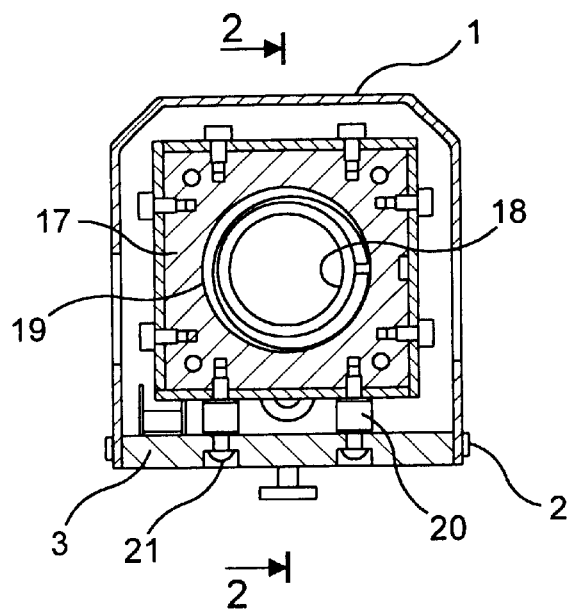
FIG. 4 is a section G—G through the arrangement.

As is shown in FIGS. 3 to 5, the module 6 inside of the outer housing 1 is connected with the base plate 3 so as to be damped against shocks with the intermediary of damping elements 20 by means of fasteners 21.

As is illustrated in FIGS. 3 and 5, adjusting and calibrating means 21 are arranged at the inner side of the terminating plate 17 of the module 6, wherein the physical relationships within the module 6 can be determined by these adjusting and calibrating means 21 in order to be able to take them into account correspondingly during the radiation measurements and to make corrections to these measurements when necessary.

Figure 6:
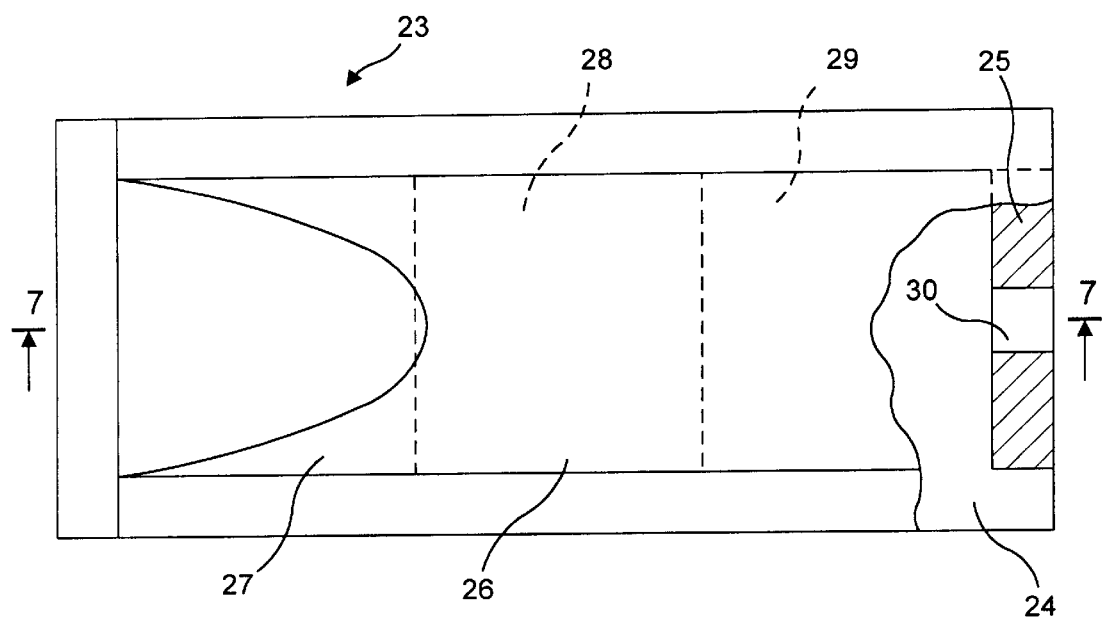
FIG. 6 is an arrangement with a module with reflector.
Figure 7:
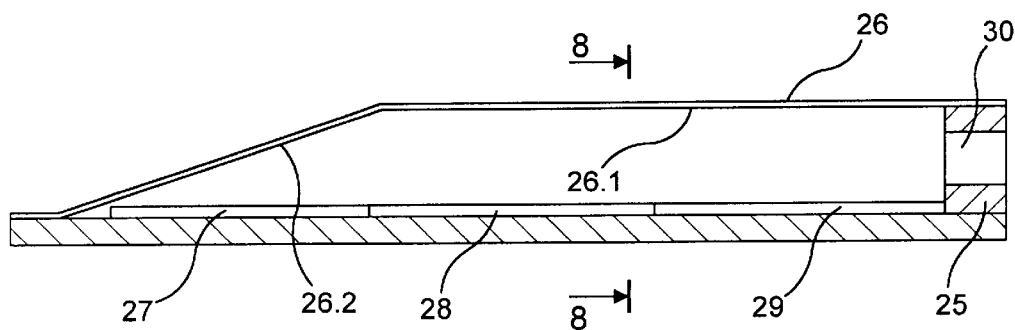
FIG. 7 is a section D—D through the module according to FIG. 6.
Figure 8:
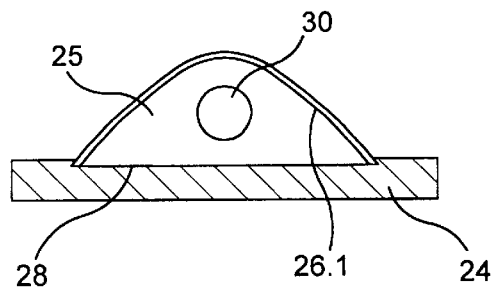
FIG. 8 is a section C—C through the module.

FIGS. 6 to 8 show a top view and sectional views of an embodiment form of the arrangement according to the invention for measuring optical radiation of radiation sources in which, for example, a module 23 comprises a base plate 24, a receiving plate 25 for receiving the radiation source to be investigated, and a reflector 26 connected with the base plate 24. In order to detect, as far as possible, the totality of radiation for measurement, the reflector 26 advantageously has a reflecting cylindrical surface 26.1 and a plane reflecting surface 26.2 which is inclined relative to the base plate 24. In this way, it is ensured that the direct radiation component as well as the reflected, i.e., indirect, radiation component of the radiation source (not shown) to be investigated contributes to the generation of valuable electrical signals by means of the detectors 27 to 29 arranged on the surface of the base plate 24 facing the reflector 26.

An opening 30 in which the radiation source to be investigated can be introduced into the module 23 is provided in the receiving plate 25.

Adjusting or calibrating means can also advantageously be arranged on the inner surface of the receiving plate 25, wherein, as in the construction of the invention shown in FIGS. 1 to 5, the physical relationships inside the module 23 are determined by the adjusting or calibrating means so that they can be taken into account in the radiation measurements.

It is also possible to calibrate this arrangement by using calibrated diffusely or directionally radiating radiation sources and to check with respect to the local measuring accuracy of the detectors for generating the relevant measurement signals.

The utilized radiation source can also be arranged so as to be movable relative to the arrangement or in the arrangement itself in order to calibrate and monitor the calibration and/or the local measuring sensitivity of the measuring means (detectors) used in the arrangement.

While the foregoing description and drawings represent the preferred embodiments of the present invention, it will be obvious to those skilled in the art that various changes and modifications may be made therein without departing from the true spirit and scope of the present invention.

What is claimed is:

1. An arrangement for measuring power or energy of optical radiation of radiation sources, especially laser radiation, having a housing comprising:

a module defining at least one of an open and at least partially closed hollow space being provided, said module having inner and outer walls;

at least one of the inner walls and outer walls of the module being at least one of entirely and partially occupied by detectors for generating measurement signals which are proportional to measured parameters of the radiation sources;

said detectors being connected together in such a way that the generated measurement signals of said detectors are further processed to form at least one resultant sum signal;

said at least one resultant sum signal being relatively independent from the position, arrangement and radiating characteristic of an examined radiation source in the module; and at least one of an opening and guide-through being provided in the module for inserting the radiation source to be examined.

2. The arrangement according to claim 1, wherein said detectors for generating the aforementioned measurement signals are at least one photoelectric receiver which relied on at least one of the internal and external photoelectric effect.

3. The arrangement according to claim 1, wherein said detectors for generating the aforementioned measurement signals are measurement gauges which react to at least one of heat and detectors which convert expansions caused by heat into electrical measurement signals.

4. The arrangement according to claim 1, wherein the walls of the module have at least one reflector which reflects, at least one of directly and via additional optical elements, a relatively large proportion of the radiation striking said at least one reflector to the aforementioned detectors for generating measurement signals.

5. The arrangement according to claim 1, wherein the measurement signal, are utilized by a following evaluating circuit for summing the signals generated by the receivers, which signals being independent from at least one of the spatial position, size, and radiating characteristic of the radiation source.

6. The arrangement according to claim 1, including receiving means for receiving the radiation source to be measured project into at least one of the housing and module.

7. The arrangement according to claim 1, wherein the receiving means for the radiation source to be measured is a first tube which is at least one of completely and partially transparent for the respective radiation and which is fixedly connected with at least one of the housing and module or is exchangeable.

8. The arrangement according to claim 1, wherein at least one of adjusting and calibrating means are provided in the interior of the module for monitoring an adjustment state and calibration state of the arrangement.

9. The arrangement according claim 1, wherein said at least one of adjusting and calibrating means includes at least one radiation source.

10. The arrangement according to claim 1, wherein at least one radiation source used for at least one of calibrating and monitoring the calibration state is an active source in the form of at least one of a laser, an incandescent lamp, an arc lamp, a heat source, a light-emitting diode and a passive source in the form of at least one of a light-conducting fiber and a light waveguide.

11. The arrangement according to claim 1, wherein a second tube which is at least one of entirely and partially transparent for the radiation to be measured is arranged in the first tube so as to be exchangeable.

12. The arrangement according to claim 1, wherein the tubes are made of at least one of glass and plastic.

13. The arrangement according to claim 1, wherein at least one of the two tubes are sterilized.

14. The arrangement according to claim 1, wherein the measurement signals obtained through the arrangement are further processed directly and are used in such a way that the radiation source is matched (calibrated) at least one of automatically and manually to a value which is preadjusted by a user.

15. The arrangement according to claim 1, wherein said arrangement are calibrated by using at least one of calibrated, diffusely radiating and directionally radiating radiation sources and are checked with respect to the local measurement accuracy of the aforementioned detectors for generating the relevant measurement signals.

16. The arrangement according to claim 1, for calibrating and monitoring at least one of the calibration and the local measurement sensitivity of the measuring means utilized in the arrangement, wherein the utilized radiation source is moved at least one of relative to the arrangement and in the arrangement.

* * * * *